US006442140B1

(12) United States Patent
Kirschenbaum (10) Patent No.: US 6,442,140 B1
(45) Date of Patent: Aug. 27, 2002

(54) METHOD FOR AUTOMATIC SETUP OF MISSING RM CELL COUNT PARAMETER CRM IN AN ATM TRAFFIC MANAGEMENT DESCRIPTOR

(75) Inventor: Ilan Kirschenbaum, Petach-Tikva (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/225,261

(22) Filed: Jan. 4, 1999

(51) Int. Cl.[7] .............................................. H04L 12/26
(52) U.S. Cl. .................................. 370/236.1; 709/235
(58) Field of Search ................................. 370/229, 231, 370/232, 236.1, 236, 236.2; 709/235

(56) References Cited

U.S. PATENT DOCUMENTS

| | | | |
|---|---|---|---|
| 5,119,364 A | * 6/1992 | Thiebaut et al. ............. | 370/232 |
| 5,138,607 A | * 8/1992 | Thiebaut et al. ............. | 370/232 |
| 5,426,635 A | 6/1995 | Mitra et al. ................... | 370/60 |
| 5,434,848 A | 7/1995 | Chimento, Jr. et al. ....... | 370/17 |
| 5,450,483 A | 9/1995 | Williams ..................... | 379/279 |
| 5,457,687 A | * 10/1995 | Newman ..................... | 370/232 |
| 5,583,792 A | 12/1996 | Li et al. .................. | 364/514 C |
| 5,633,859 A | * 5/1997 | Jain et al. ................... | 370/234 |
| 5,754,530 A | 5/1998 | Awdeh et al. ................. | 370/232 |
| 5,805,577 A | * 9/1998 | Jain et al. ................... | 370/234 |
| 5,828,654 A | * 10/1998 | Takase et al. ................ | 370/233 |
| 5,956,322 A | * 9/1999 | Charny ...................... | 370/235 |
| 5,974,033 A | * 10/1999 | Kamiya et al. ............. | 370/230 |
| 5,991,265 A | * 11/1999 | Lincoln ...................... | 370/234 |
| 5,991,268 A | * 11/1999 | Awdeh et al. ................ | 370/235 |
| 6,061,330 A | * 5/2000 | Johansson .................... | 370/229 |

OTHER PUBLICATIONS

Bauer, Daniel. "An Error–Control Scheme for a Multiprotocol Based on Round–Trip Time Calculations". 1996 IEEE.*
S. Mascolo. "End to End Congestion Control and Bandwidth Measurement in High Speed ATM Networks". Not dated.*
H. T. Kung and Koling Chang. Received–Oriented Adaptive Buffer Allocation in Credit–Based Flow Control of ATM Networks. 1995 IEEE.*

(List continued on next page.)

Primary Examiner—Melvin Marcelo
Assistant Examiner—Derrick W. Ferris
(74) Attorney, Agent, or Firm—Howard Zaretsky (57) ABSTRACT

A method of measuring the round trip time (RTT) of a virtual circuit (VC) utilizing the Traffic Management mechanism of ATM and adapting the CRM (also known as XRM) Traffic Management descriptor parameter accordingly. The CRM parameter is setup adaptively and individually for a particular VC in real time while traffic is flowing so as to achieve better performance of the network. The invention comprises CRM calculation means, a database for storage of RM cell related information, including but not limited to, RM cell assigned sequence numbers, transmission times, reception times, etc., means for filtering the transmission and reception times. The CRM calculator functions to track the transmission and reception of RM cells from the source end station using a unique sequence number assigned to each RM cell. Filters can optionally be used to smooth the data recorded that is derived from RM cell transmission events, e.g., calculated round trip time (RTT).

18 Claims, 5 Drawing Sheets

OTHER PUBLICATIONS

Jacobson, V., "Modified TCP Congestion Avoidance Algorithm. End–to–end mailing list, Apr. 1990", Available from ftp://ftp.isi.edu/end2end/end2end–interest–1990.mail, (1990). Describes the Fast Retransmit Algorithm in TCP.

The ATM Forum, ATM User Network Interface (UNI) Specification, Version 3.0, Prentice Hall, (1995), pp. 60–68.

Keshav, S., "An Engineering Approach to Computer Networking. ATM Networks, the Internet, and the Telephone Network", Addison–Wesley Professional Computing Series, (1998), pp. 383–386.

"Traffic Management Specification version 4.0", af95–0013R11 Letter Ballot, ATM Forum Technical Committee, pp. 40–51.

Jacobson, V. et al., "Congestion Avoidance and Control", Nov. 1988, pp. 1–21.

ITU–T Recommendation I.371, International Telecommunication Union, (Aug. 1996), pp. 32–40, 69–70.

ITU–T Recommendation I.371.1, International Telecommunication Union, (Jun. 1997), pp. 1–27.

* cited by examiner

METHOD FOR AUTOMATIC SETUP OF MISSING RM CELL COUNT PARAMETER CRM IN AN ATM TRAFFIC MANAGEMENT DESCRIPTOR

FIELD OF THE INVENTION

The present invention relates generally to data communication networks and more particularly relates to a method for the automatic setup of the CRM Traffic management parameter in ATM networks.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network to Network Interface (PNNI) Phase 0 and Phase 1 specifications published by the ATM Forum. The previous Phase 0 draft specification is referred to as the Interim Inter-Switch Signaling Protocol (IISP). The goal of the PNNI specifications is to provide customers of ATM network equipment multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

The ATM Header

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI state which is encoded in the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

Both switches and end stations in the network implement ABR. Binary switches monitor their queue lengths, set the PTI for congestion state (EFCI) in the cell headers, but do not deal with the computation of explicit rate feedback when congestion occurs.

Explicit rate switches compute the rate at which a source end station can transmit and place this information in the explicit rate field in the returning resource management cell. The destination sends one resource management cell for every N data cells transmitted. If the source does not receive a returning resource management cell, it decreases its allowed cell rate. This results in the source automatically reducing its rate in cases of extreme congestion.

In the case when the source receives a resource management cell, it checks the congestion indication flag (CI bit), after which the sending rate may be increased. If the flag is set, then the sending rate must be reduced. After this stage, the rate is set to the minimum of the above and the explicit rate field.

A fourth class of service, unspecified bit rate (UBR), is utilized by data applications that are not sensitive to cell loss or delay and want to use leftover capacity. During congestion, the cells are lost but the sources are not expected to reduce their cell rate.

Traffic Management

Traffic management (TM) can be defined as the process by which the flow of cells from one device to another within the ATM network is controlled in order to allow for the greatest possible flow rate for the longest possible periods of time. ATM network congestion is defined as a state of network elements (e.g., switches, concentrators, etc.) in which the network is not able to meet the negotiated network performance objectives for the already established connections, resulting in lost cells. ATM layer congestion can be caused by unpredictable statistical fluctuation of traffic flows or fault conditions within the network. The purpose of traffic management is to ensure that users get their desired quality of service. During periods of heavy loads, when traffic cannot be predicted in advance, ensuring quality of service presents a problem. This is the reason congestion control is the most essential aspect of traffic management.

Traffic management refers to the set of actions taken by the network to avoid congested conditions. Congestion control refers to the set of actions taken by the network to minimize the intensity, spread and duration of congestion. These actions are triggered by congestion in one or more network elements. In general, the following traffic and congestion control functions are available within ATM networking.

The ATM standard defines a standard mechanism for the ATM network for indicating congestion states (e.g., setting the EFCI encoded in the cell header) and for indicating cell loss priority for selecting which cell to drop first in case congestion exists. Explicit forward congestion indication (EFCI) is a congestion notification mechanism that the ATM layer service user may make use of to improve the utility that can be derived from the ATM layer. A network element sets the EFCI in the cell header in an impending congested or already congested state. A congested network element can selectively discard cells explicitly identified as belonging to a non-compliant ATM connection and/or those cells with their CLP bit set. This is to protect cells without their CLP bit cleared from being discarded for as long as possible.

Figure 1:
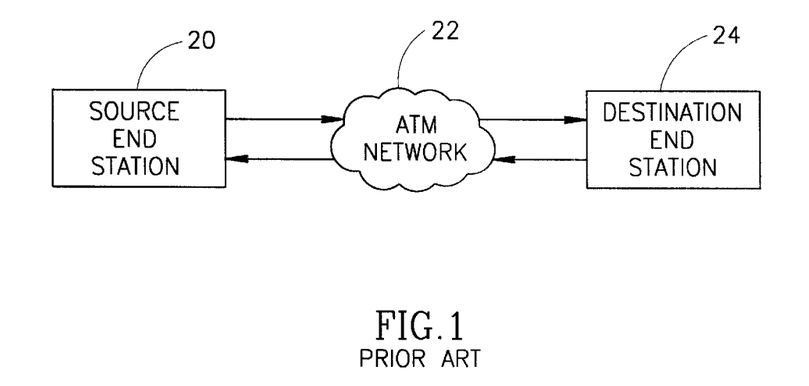
FIG. 1 illustrates an example ATM network including a source end station and a destination end station coupled together by an ATM network.

For ABR traffic, the ATM forum has defined a traffic management scheme that uses Resource Management (RM) cells to control the traffic rate through the network based in part on the EFCI mechanism defined previously. With reference to FIG. 1, a source end station (SES) 20 inserts forward RM cells into the ATM network 22. The destination end station (DES) 24, upon receiving these forward RM cells, turns them around and sends them back as backward RM cells.

Implicit Rate ABR

In prior art implicit rate control, if there has been congestion on the forward path (recognized at the DES (FIG. 1) by the EFCI bits of the incoming data cells), a congestion field in the backward RM cell is marked (i.e. set to a '1'). The SES 20 receives the backward RM cell and acts upon it. If the congestion field indicates congestion or if the RM cell is not returned, the sending rate is reduced. When the SES 20 receives a backward RM cell with the congestion field not indicating a congestion, it may increase the sending rate on that particular virtual circuit (VC).

Explicit Rate ABR

Explicit rate control enhances the implicit rate control by adding an explicit rate field to the RM cell. In this field, the SES indicates the rate at which it would like to transmit. If an explicit rate switch exists in the VC route it may reduce the value in the explicit rate field in the backward RM cells in case of congestion. In this case (the example in FIG. 1) explicit rate for the SES is indicated. The SES upon receiving the RM cells, adjusts its sending rate according to the explicit rate fields.

Figure 2:
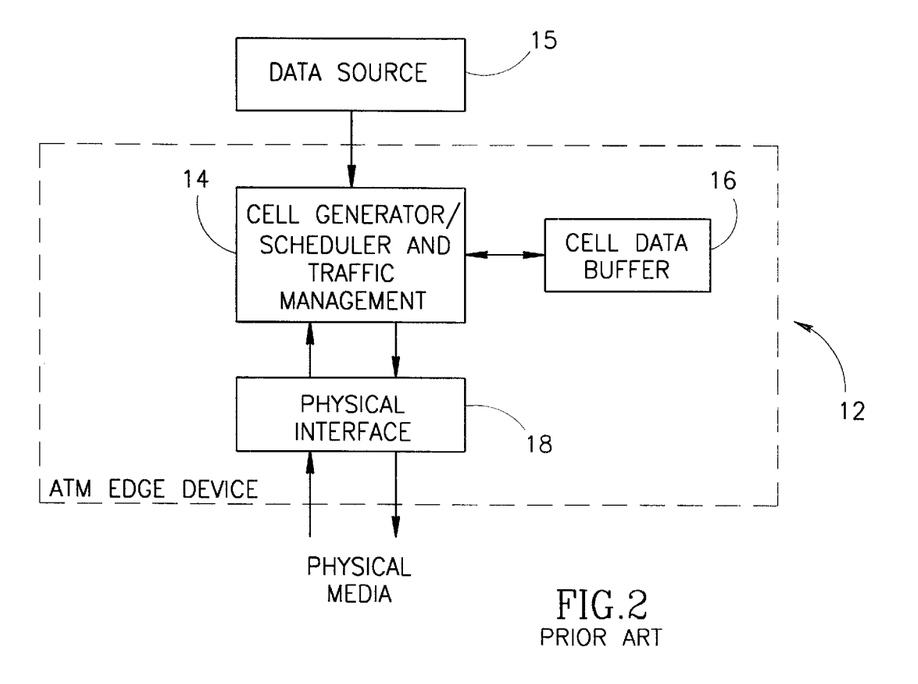
FIG. 2 is a block diagram illustrating a prior art ATM edge device including a cell scheduler coupled to a physical interface and a cell data buffer.

A block diagram of a portion of a typical ATM edge device 12 (i.e. a device that resides on the outer border of an ATM network) is illustrated in FIG. 2. A data source 15 is shown coupled to a cell generator and scheduler 14 which, in turn, is coupled to a cell data buffer 16 and a physical interface 18. Data source 15 may be any device or system that supplies data to be transported over the physical media, e.g., Token Ring, Ethernet, video conferencing, etc. The function of physical interface 18 is to couple transmit and receive data from the physical media to cell generator/scheduler and traffic management module 14. Cell data buffer 16 functions as a temporary holding memory until cell generator/scheduler and traffic management module 14 has finished processing cells. The module functions to transmit cells at the current transmit rate and modify the transmit rate in accordance with traffic management direction.

Figure 3:
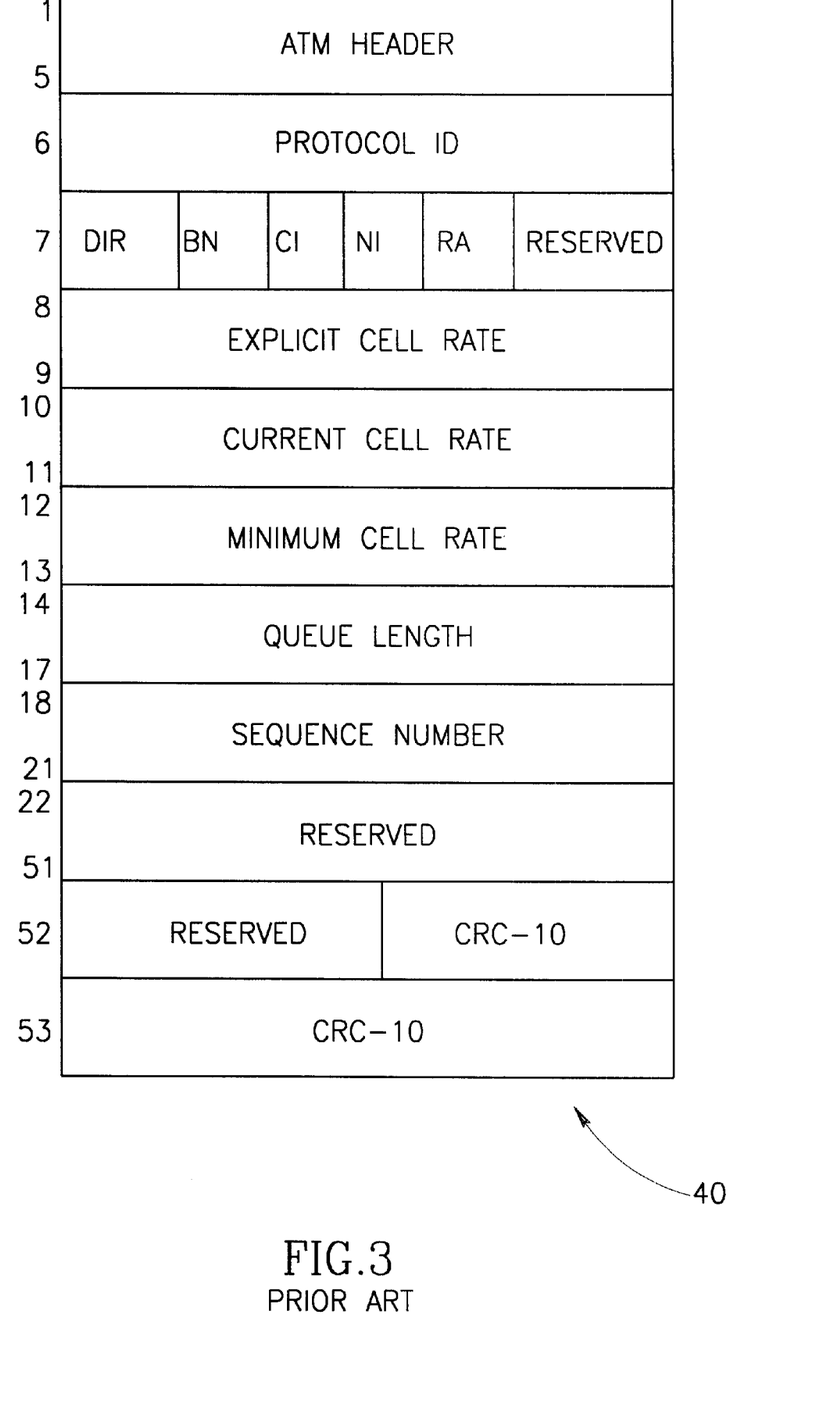
FIG. 3 is a diagram illustrating the field format of a standard Resource Management (RM)

A diagram illustrating the fields and their positions in a standard Traffic Management RM cell is shown in FIG. 3. The cell format 40 is shown in increasing byte order starting with byte number one. The ATM header comprises bytes 1–5. The protocol ID comprises byte 6. Byte 7 comprises a direction (DR) bit (forward=0, backward=1), a BECN cell indicator (a 1 if switch generated), a congestion indication (CI) bit (a 1 if congestion present), a no increase (NI) bit (a 1 means do not increase rate), a request acknowledge (RA) bit and a 3 bit reserved field. The explicit cell rate (ER) comprises bytes 8–9. Bytes 10–11 comprise the current cell rate (CCR). Bytes 12–13 comprise the minimum cell rate (MCR). The queue length indicator (QL) comprises bytes 14–17. The sequence number (SN) (an integer number) comprises bytes 18–21. Bytes 22–51 and a portion of byte 52 are reserved. A CRC-10 field occupies the remainder of byte 52 and byte 53.

In order to implement traffic management functions and the handling of RM cells, a common prior art approach is to modify cell scheduler 14 to include traffic management functions. The disadvantage of this approach is that it is usually a complex and expensive process. In addition, if traffic management functions are to be incorporated into different cell schedulers, the process must be repeated for each one.

One of the drawbacks, however, of the ATM protocol is its complexity. The protocol requires the setup of numerous parameters prior to the operation of the network and prior to the establishment of each call connection. The Traffic Management mechanism utilizes transmission descriptors in the performance of its tasks. The descriptors comprise a plurality of parameters that characterize the transmission behavior of the SES and are described below.

| | |
|---|---|
| PCR | Peak Cell Rate to which the rate of the VC can reach. |
| MCR | Minimum Cell Rate to which the rate of the VC can be reduced. |
| ICR | Initial Cell Rate, the rate at which a source should send initially and after an idle period. |
| RIF | Rate Increase Factor, controls the amount by which the cell transmission rate may increase upon receipt of an RM cell. |
| Nrm | the maximum number of data cells a source may send between two successive RM cells. |
| Mrm | controls allocation of bandwidth between forward RM cells, backward RM cells and data cells. |
| RDF | Rate Decrease Factor measured in per cent. The multiplicative rate reduction applied upon Congestion Indication (CI), e.g., the rate is reduced by 93% |
| ACR | Allowed Cell Rate, the current rate at which a source is allowed to send. |
| CRM | missing RM cell count, i.e., the number of lost RM cells permitted before reducing the transmission rate. CRM limits the number of forward RM cells which may be sent in the absence of received backward RM cells. For example, for CRM = 1, if an RM cell is about to be transmitted, after NRM data cells have been transmitted and the previous RM cell has not yet been received, a rate reduction would occur. |
| ADTF | ACR Decrease Time Factor is the time permitted between sending RM cells before the rate is decreased to ICR. |
| Trm | provides an upper bound on the time between forward RM cells for an active source. |
| FRTT | the Fixed Round Trip Time, the sum of the fixed and propagation delays from the source to a destination and back. |
| TBE | Transient Buffer Exposure, the negotiated number of cells that the network would like to limit the source to sending during startup periods, before the first RM cell returns. |
| CDF | Cutoff Decrease Factor, controls the decrease in ACR associated with CRM. |
| TCR | Tagged Cell Rate, limits the rate at which a source may send out of rate forward RM cells. |
| AIR | Rate Increase Factor measured in Mbps. The additive rate increase applied when no congestion is detected, e.g., the rate is increased by 1 Mbps. |
| XDF | Rate Decrease Factor at lost RM cell measured in per cent and usually take as the RDF. |

The CRM parameter was previously known as the XRM parameter but is currently referred to now as the missing RM cell count or CRM parameter. The CRM field of the Traffic Management descriptor represents the missing RM-cell count that limits the number of forward RM cells that may be sent in the absence of received backward RM cells. In other words, the CRM parameter determines the number of RM cells that can be lost before the VC transmit rate is decreased. For example, if CRM equals 2 and RM cell #5 is about to be transmitted, but RM cells #3 and #4 have not been received yet, the VC transmit rate should be decreased since the RM cell #5 if sent could get lost due to congestion in the network.

Note that almost all the other Traffic Management descriptor parameters, e.g., Nrm, PCR, MCR, etc., can be set with a priori values, the CRM parameter, however, is strongly dependent on the network topology, i.e., number of hops, and the devices that are in use in the network. In the prior art, the setup of the CRM parameter utilizes the cooperation of one or more network elements during setup or, in the alternative, the CRM parameter is set a priori to a particular value. Note also that bad or incorrect tuning of the CRM parameter (either too high or too low) can lead to a major reduction in performance when using Traffic Management in ATM networks.

As another example, consider a call connection set up between a source end station and a destination end station over a path that comprises a large number of hops. Suppose CRM is set to a default value of 1 and the NRM field (the maximum number of cells a source may send for each forward RM cell) is set to a default value of 32. Data cells begin to be transmitted into the long VC. The transmitting source end finishes transmitting the 32 data cells and transmits the RM cell.

The source end station then examines its receiver waiting for the transmitted RM cell to return. Assume the transmitted RM cell is not received for a relatively long time due to long RTT (many hops) or due to congestion in the network The RM cell did not get lost but the RTT is too long. Since the CRM parameter is not set to a proper value, the source end station, in response to the long RTT, needlessly reduces the transmission rate that results in a reduction of performance.

One the other hand, if the CRM parameter is set to too big a value, it will be discovered too late that one or more RM cells were lost, which also leads to degradation of performance. Note that the Nrm parameter can be set to a value less than 32 for fast response to network congestion with the consequence that more RM cells are generated.

Note also that, in connection with the TBE parameter, some vendors do not implement the software option specified by the TBE parameter, thus the CRM parameter must be set a priori in these products.

SUMMARY OF THE INVENTION

The present invention is a method of measuring the round trip time (RTT) of a virtual circuit (VC) utilizing the Traffic Management mechanism of ATM and automatically setting up the CRM Traffic Management descriptor parameter accordingly. The CRM parameter is setup adaptively and individually for a particular VC in real time while traffic is flowing so as to achieve better performance of the network.

The invention comprises means for the determination of an estimate of the CRM parameter. The means comprises CRM calculation means, a database for storage of RM cell related information, including but not limited to, RM cell assigned sequence numbers, transmission times, reception times, etc., means for filtering the transmission and reception times.

Under normal operation, the transmitter in the source end station sends data packets over the ATM network to a destination end station. Periodically, RM cells are sent out to the destination end station and back.

The CRM calculator functions to track the transmission and reception of RM cells from the source end station. Every RM cell transmitted is given a unique sequence number. All RM cell transmission and reception events are recorded in the database. A filter functions to smooth the data recorded that is derived from RM cell transmission events, e.g., calculated round trip time (RTT). Similarly, the filter functions to smooth the data recorded that is derived from RM cell reception events. The filters may comprise Exponential Averaging Filters that are filters well known in the data communication arts.

Data recorded in the database include various RM cell statistics including but not limited to sequence numbers, time of transmission, time of reception, etc. Note that either filtered data, non-filtered data or both can be stored in and/or retrieved from the database. In determining an estimate for the CRM parameter, the CRM calculator utilizes the data previously stored in the database.

It is important to note that, in the prior art, the CRM parameter is initially set to $$CRM = \left\lceil \frac{TBE}{Nrm} \right\rceil \tag{1}$$

This initial CRM parameter is setup via negotiation with other network elements during the initial startup period. The method of the present invention has an advantage over the prior art in that it does not place any additional requirement on the DES and the network elements and is operative to adapt itself dynamically in real time.

In addition, in the prior art, after setting CRM initially, the CRM parameter remains as defined at startup. In the event there are major traffic load variations, the CRM parameter will typically not be optimum. The method of the present invention, however, functions to dynamically adjust the CRM on a continuous basis.

There is provided in accordance with the present invention a method for adapting the missing Resource Management (RM) cell count (CRM) parameter for a Virtual Circuit (VC) in a Traffic Management (TM) descriptor to the state of an Asynchronous Transfer Mode (ATM) network, the method comprising the steps of measuring the round trip time (RTT) value from a source end station (SES) to a destination end station (DES) and back and measuring the transmission time interval between consecutive transmissions, calculating an estimate for the CRM parameter utilizing the following equation:

$$\text{current\_CRM} = \text{linear\_co\_1} + \text{RTT\_mul} \cdot \left[ \text{linear\_co\_2} \cdot \frac{\text{RTT\_interval}}{\text{RM\_Tx\_interval}} \right]$$

wherein
curr_CRM is the current estimate of the CRM parameter, linear_co_1 is a first linearity coefficient for adjusting the calculation of RM, linear_co_2 is a second linearity coefficient for adjusting the calculation of RM, RTT_mul defines how much larger CRM should be relative to the calculated value, RTT_interval is the round trip time interval, RM_Tx_interval is the elapsed time between the transmission of N successive RM cells, wherein N is a positive integer.

The step of measuring the round trip time comprises the steps of setting a Sequence Number (SN) field of the RM cell to a unique value, transmitting the RM cell, recording the time of transmission of the RM cell in a database, receiving the RM cell some time later, recording the time of reception of the RM cell in the database and calculating the round trip time utilizing the time of transmission and the time of reception.

The step of measuring the round trip time comprises the steps of setting a field in the Function Specific Fields portion of an Operation and Maintenance (OAM) cell to a unique sequence number, transmitting the RM cell, recording the time of transmission of the RM cell in a database, receiving the RM cell some time later, recording the time of reception of the RM cell in the database and calculating the round trip time utilizing the time of transmission and the time of reception.

There is also provided in accordance with the present invention a method for adapting the missing Resource Management (RM) cell count (CRM) parameter for a Virtual Circuit (VC) in a Traffic Management (TM) descriptor to the state of an Asynchronous Transfer Mode (ATM) network, the method comprising the steps of measuring the round trip time (RTT) value from a source end station (SES) to a destination end station (DES) and back, measuring the transmission time interval between consecutive transmissions, filtering a plurality of the round trip time values utilizing an exponential averaging filter, calculating an estimate for the CRM parameter utilizing the following equation:

$$\text{current\_CRM} = \text{linear\_co\_1} + \text{RTT\_mul} \cdot \left[ \text{linear\_co\_2} \cdot \frac{\text{RTT\_interval}}{\text{RM\_Tx\_interval}} \right]$$

wherein
curr_CRM is the current estimate of the CRM parameter, linear_co_1 is a first linearity coefficient for adjusting the calculation of RM, linear_co_2 is a second linearity coefficient for adjusting the calculation of RM, RTT_mul defines how much larger CRM should be relative to the calculated value, RTT_interval is the round trip time interval filtered by the exponential averaging filter, RM_Tx_interval is the elapsed time between the transmission of N successive RM cells filtered by the exponential averaging filter, wherein N is an integer.

Further, there is provided in accordance with the present invention a method for adapting the missing Resource Management (RM) cell count (CRM) parameter for a Virtual Circuit (VC) in a Traffic Management (TM) descriptor to the state of an Asynchronous Transfer Mode (ATM) network, the method comprising the steps of measuring the round trip time (RTT) value from a source end station (SES) to a destination end station (DES) and back and measuring the transmission time interval between consecutive transmissions, calculating an estimate for the CRM parameter as a function of the following:

curr_CRM=$f$(RTT_interval,RM_Tx_interval)

wherein
curr_CRM is the current estimate of the CRM parameter, RTT_interval is the round trip time interval, RM_Tx_interval is the elapsed time between the transmission of N successive RM cells, wherein N is an integer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ABR | Available Bit Rate |
| ACR | Allowed Cell Rate |
| ADTF | ACR Decrease Time Factor |
| AIR | Additive Increase Rate |
| ANSI | American National Standards Institute |
| ATM | Asynchronous Transfer Mode |
| BECN | Backward Explicit Congestion Notification |
| CBR | Constant Bit Rate |
| CCITT | Comite Consulatif International Telegraphique et Telephonique |
| CCR | Current Cell Rate |
| CDF | Cutoff Decrease Factor |
| CDV | Cell Delay Variation |
| CI | Congestion Indication |
| CLP | Cell Loss Priority |
| CRC | Cyclic Redundancy Check |
| CRM | Missing RM Cell Count |
| CTD | Cell Transfer Delay |
| DES | Destination End Station |
| DR | Direction |
| EFCI | Explicit Forward Congestion Indication |
| ER | Explicit Cell Rate |
| FDDI | Fiber Distributed Data Interface |
| FRTT | Fixed Round Trip Time |
| GFC | Generic Flow Control |
| HEC | Header Error Check |
| ICR | Initial Cell Rate |
| IISP | Interim Inter-Switch Signaling Protocol |
| ILMI | Interim Local Management Interface |
| ITU | International Telecommunications Union |
| LEC | LAN Emulation Client |
| MCR | Minimum Cell Rate |
| Mrm | controls allocation of bandwidth between forward RM cells, backward RM cells and data cells |
| NI | No Increase |
| Nrm | the maximum number of data cells a source may send between two successive RM cells |
| OAM | Operation And Maintenance |
| OSPF | Open Shortest Path First |
| PCR | Peak Cell Rate |
| PNNI | Private Network to Network Interface |
| PT | Payload Type |
| PTI | Payload Type Identifier |
| QL | Queue Length Indicator |
| QoS | Quality of Service |
| RA | Request Acknowledge |
| RDF | Rate Decrease Factor |
| RIF | Rate Increase Factor |
| RM | Resource Management |
| RTT | Round Trip Time |
| SES | Source End Station |

-continued

| Term | Definition |
| --- | --- |
| SN | Sequence Number |
| TBE | Transient Buffer Exposure |
| TCR | Tagged Cell Rate |
| TM | Traffic Management |
| Trm | upper bound on the time between forward RM cells |
| UBR | Unspecified Bit Rate |
| UNI | User to Network Interface |
| VBR | Variable Bit Rate |
| VC | Virtual Circuit |
| VCC | Virtual Channel Connection |
| VCI | Virtual Circuit Identifier |
| VPI | Virtual Path Identifier |
| XDF | Rate Decrease Factor |
| XRM | Missing RM Cell Count (old term) |

General Description

The present invention is a method of measuring the round trip time (RTT) of a virtual circuit (VC) utilizing the Traffic Management mechanism of ATM and automatically setting up the CRM Traffic Management descriptor parameter accordingly. The CRM parameter is setup adaptively and individually for a particular VC in real time while traffic is flowing so as to achieve better performance of the network.

Figure 4:
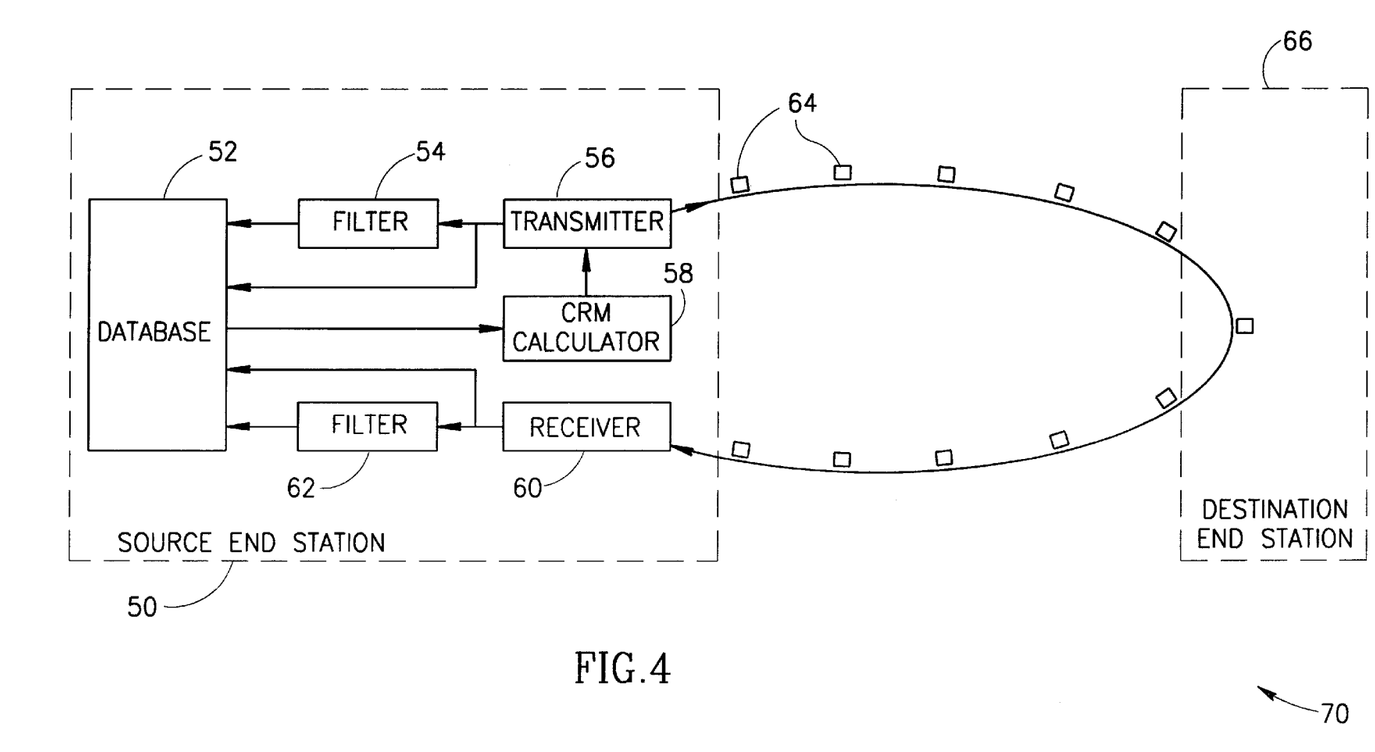
FIG. 4 is a diagram illustrating the CRM parameter generation means in a source end station communicating with a destination end station.

A diagram illustrating the CRM parameter generation means in a source end station communicating with a destination end station is shown in FIG. 4. The network, generally referenced 70, comprises a source end station 50 and a destination end station 66. The source end station comprises a transmitter 56, receiver 60, CRM calculator 58, filters 54, 62 and database 52. Both the source end station and destination end station also comprise the necessary hardware and software (not shown) required for performing ATM functions which has been omitted from FIG. 4 for clarity sake.

Under normal operation, the transmitter 56 transmits data packets onto the ATM network to destination end station 66. Periodically, RM cells are sent which are indicated by the spaced apart squares 64.

The CRM calculator 58 functions to track the transmission and reception of RM cells from the source end station. Every RM cell transmitted is given a unique sequence number. All RM cell transmission and reception events are recorded in the database 52. The filter 54 functions to smooth the data recorded that is derived from RM cell transmission events, e.g., calculated round trip time (RTT). Similarly, the filter 62 functions to smooth the data recorded that is derived from RM cell reception events. Data recorded in the database includes various RM cell statistics including but not limited to sequence numbers, time of transmission, time of reception, etc. Note that either filtered data, non-filtered data or both can be stored in and/or retrieved from the database 52.

The CRM calculator functions to perform the method of the present invention which is described in more detail hereinbelow. The method functions to optionally filter the times associated with events that occur in the transmitter and receiver so as to better estimate the CRM parameter. In determining an estimate for the CRM parameter, the CRM calculator utilizes the data previously stored in the database.

The method of the present invention is applicable in networks which implement a Traffic Management (TM) mechanism such as specified by the ATM standard in Traffic Management Specification Version 4.0, incorporated herein by reference. The following is an implementation example of a TM portion of an ATM end station and is not intended to limit the scope of the present invention. The Traffic Management specifications as formed by the ATM Forum specify an end to end congestion control algorithm, i.e., the implicit portion. Three tables are used for controlling the transmission rate of an individual virtual circuit: (1) Increase table, (2) Decrease table and (3) Xdecrease table.

Note that there are a few useful metrics or parameters when dealing with Quality of Service (QoS) in ATM networks. One of the parameters is the cell delay which can be represented in various forms using the following terms:

1. End to End Transit Delay
2. Cell Delay Variation (CDV)
3. Cell Transfer Delay (CTD)
4. Peak to Peak Cell Delay Variation
5. Cumulative RM Fixed Round Trip Time (FRTT)
6. PNNI Cell Transfer Delay The method teaches a way for measuring the cell RTT in real time for each individual VC independently on an end to end, user to user or LEC to LEC basis.

The traffic for each VC can be controlled as defined by the ATM Forum using Resource Management (RM) cells and the above three tables. The traffic for each VC flows according to a predefined descriptor which determines the rate increase and decrease permitted for the rate transmission of that VC. The behavior of a TM descriptor is defined by the parameters discussed above.

The Increase, Decrease and Xdecrease tables mentioned above are used for controlling the rate of transmission of a VC. Each table has 256 entries wherein each entry represents a rate. The content of each of the three tables can be different. The contents of a representative table is presented below in Table 1.

TABLE 1

| Index (Dec) | Index (Hex) | Rate (Mbps) |
|---|---|---|
| 0 | 0 × 00 | 155.000000 |
| 1 | 0 × 01 | 155.000000 |
| 2 | 0 × 02 | 155.000000 |
| 3 | 0 × 03 | 155.000000 |
| 4 | 0 × 04 | 155.000000 |
| 5 | 0 × 05 | 155.000000 |
| 6 | 0 × 06 | 155.000000 |
| 7 | 0 × 07 | 155.000000 |
| 8 | 0 × 08 | 155.000000 |
| 9 | 0 × 09 | 137.777778 |
| 10 | 0 × 0A | 124.000000 |
| 11 | 0 × 0B | 112.727273 |
| 12 | 0 × 0C | 103.333333 |
| 13 | 0 × 0D | 95.384615 |
| 14 | 0 × 0E | 88.571429 |
| 15 | 0 × 0F | 82.666667 |
| 16 | 0 × 10 | 77.500000 |
| 17 | 0 × 11 | 72.941176 |
| 18 | 0 × 12 | 68.888889 |
| 19 | 0 × 13 | 65.263158 |
| 20 | 0 × 14 | 62.000000 |
| 21 | 0 × 15 | 59.047619 |
| 22 | 0 × 16 | 56.363636 |
| 23 | 0 × 17 | 53.913043 |
| 24 | 0 × 18 | 51.666667 |
| 25 | 0 × 19 | 49.600000 |
| 26 | 0 × 1A | 47.692308 |
| 27 | 0 × 1B | 45.925926 |
| 28 | 0 × 1C | 44.285714 |
| 168 | 0 × A8 | 0.484375 |
| 169 | 0 × A9 | 0.472561 |
| 170 | 0 × AA | 0.461310 |
| 171 | 0 × AB | 0.450581 |
| 172 | 0 × AC | 0.440341 |

TABLE 1-continued

| Index (Dec) | Index (Hex) | Rate (Mbps) |
|---|---|---|
| 173 | 0 × AD | 0.430556 |
| 174 | 0 × AE | 0.421196 |
| 175 | 0 × AF | 0.412234 |
| 176 | 0 × B0 | 0.403646 |
| 177 | 0 × B1 | 0.395408 |
| 178 | 0 × B2 | 0.387500 |
| 245 | 0 × F5 | 0.045696 |
| 246 | 0 × F6 | 0.044850 |
| 247 | 0 × F7 | 0.044034 |
| 248 | 0 × F8 | 0.043248 |
| 249 | 0 × F9 | 0.042489 |
| 250 | 0 × FA | 0.041756 |
| 251 | 0 × FB | 0.041049 |
| 252 | 0 × FC | 0.040365 |
| 253 | 0 × FD | 0.039703 |
| 254 | 0 × FE | 0.039062 |
| 255 | 0 × FF | 0.038442 |

Upon a particular event, i.e., Congestion Indication (CI), no congestion or RM cell loss, the relevant table is accessed and a lookup is performed using the VC's current transmission rate, which is represented by 8 bits and thus can be used as an index into the table. Based on the index, the contents corresponding to that entry are read and applied as the new current VC transmission rate. On a congestion indication, the Decrease table is used; for no congestion, the Increase table is used; and on RM cell loss (or delay), the Xdecrease table is used.

A second table, Table 2, is presented as a second example of a rate manipulation table. Each rate is represented as an 8 bit integer with the most significant 2 bits representing the prescale and the least significant 6 bits representing the count. Each 8 bit code represents a rate with the table containing 256 entries. Thus, each 8 bit code can be used as an index to one of the 3 tables. The table to use depends on the congestion notification stored in the returning RM cells or upon loss of one or more RM cells. The cell generator/scheduler and traffic management module in an ATM device uses the 8 bit rate code to determine current transmission rate.

When accessing a table, the current rate transmission code is used as an index to one of the tables. The contents of the indexed location is used as the next transmission rate. The contents of the tables is setup according to the desired rate increase and decrease behavior as embodied in a formula describing the behavior. For example, if the 8 bit code 0×10 represents a rate of 77.5 Mbps, upon receiving a RM cell with CI=1, the next rate is decreased by 93% and the contents of location 0×10 in the Decrease table corresponds to 0×5C. Upon receiving an RM cell will CI=0, the next rate is increased by 5.16 Mbps, then the contents of location 0×10 in the Increase table is 0×0F.

The 2 bit prescale represents one of the following four ranges: 8, 1, 1/8 or 1/64. The 6 bit counter represents values 1 through 63. The typical rate values of the following table were calculated using a peak rate of 155 Mbps. Note that the actual peak bit rate in an OC-3 interface is 155 Mbps and the maximum useable data bit rate (not including SONET overhead, etc.) is 149.76 Mbps.

TABLE 2

Round Trip Time Measurement and Transmission Rate

| Counter | Prescale Rate (bps) | | | |
|---|---|---|---|---|
| | 8 (00) | 1 (01) | ⅛ (10) | 1/64 (11) |
| 0 | stop sending | — | — | — |
| 1 | send now | 155,000,000 | 19,375,000 | 2,421,875 |
| 2 | — | 77,500,000 | 9,687,500 | 1,210,938 |
| 4 | — | 38,750,000 | 4,843,750 | 605,469 |
| 6 | — | 25,833,333 | 3,229,167 | 403,646 |
| 8 | 155,000,000 | 19,375,000 | 2,421,875 | 302,734 |
| 10 | 124,000,000 | 15,500,000 | 1,937,500 | 242,188 |
| 12 | 103,333,333 | 12,916,667 | 1,614,583 | 201,823 |
| 16 | 77,500,000 | 9,687,500 | 1,210,938 | 151,367 |
| 20 | 62,000,000 | 7,750,000 | 968,750 | 121,094 |
| 24 | 51,666,667 | 6,458,333 | 807,292 | 100,911 |
| 28 | 44,285,714 | 5,535,714 | 691,964 | 86,496 |
| 32 | 38,750,000 | 4,843,750 | 605,469 | 75,684 |
| 36 | 34,444,444 | 4,305,556 | 538,194 | 67,274 |
| 40 | 31,000,000 | 3,875,000 | 484,375 | 60,547 |
| 44 | 28,181,818 | 3,522,727 | 440,341 | 55,043 |
| 48 | 25,833,333 | 3,229,167 | 403,646 | 50,456 |
| 52 | 23,846,154 | 2,980,769 | 372,596 | 46,575 |
| 56 | 22,142,857 | 2,767,857 | 345,982 | 43,248 |
| 60 | 20,666,667 | 2,583,333 | 322,917 | 40,365 |
| 63 | 19,682,540 | 2,460,317 | 307,540 | 38,442 |

The RM cell content includes several fields as described above, in particular, the cell sequence number (SN) which occupies bytes 18 through 21 in the RM cell. The method of the present invention utilizes the SN field of the RM cell. In normal operation, the cells transmitted include data cells with RM cells being periodically injected into the cell stream. Each transmitted cell can be viewed as representing a time slice, wherein the duration of the time slice is related to the transmission rate. Thus, the data transmitted between two successive RM cells can be viewed as a time axis. A real time clock can be implemented to measure the elapsed time between the transmission of two successive RM cells. Multiple elapsed time measurements are averaged to obtain the average transmission time between any N successive RM cells. The term average is appropriate since each cell may be transmitted using different a transmission rate.

The round trip time (RTT) is measured utilizing the SN field in the RM cell. The time that elapses between the transmission of the RM cell containing a particular SN till the reception of the same RM cell is measured. A database is maintained that stores all the information necessary for performing the method, e.g., time of transmission, SN, time of reception, etc.

If the RM cell is lost, however, an error is recognized to have occurred and the timestamp of the lost RM cell is deleted from the database. The time stamp of the RM cells that have been transmitted but have not been received are saved in the database, assuming that it is known they were not lost. A RM cell is deemed lost if its successive RM cell is received first, i.e., the order of the received sequence numbers skips by one or more entries. For example, if RM cells with sequence numbers 4, 5 and 6 are transmitted and RM cells with SN=4 and SN=6 are received, it can be assumed that RM cell with SN=5 was lost. Note that it is assumed that there is no cell bypassing, thus it can be known with certainty that an RM cell was lost.

In this fashion, the RTT of that particular VCC is determined. The real time clock can be implemented, for example, using a hardware counter within the circuitry that implements the ABR TM mechanism. Note that since data cells represent time, a modification of the transmission rate causes the time 'axis' to be 'stretched' or 'shrunk,' thus achieving fine-tuning of the CRM calculations, i.e., by fine tuning the denominator of the fraction $$\frac{RTT}{TxTime},$$

where RTT is measured after an RM cell has left the device).

The measurement can be fine-tuned by measuring the elapsed time between the transmission of N successive RM cells and dividing this quantity by N. This can similarly be performed for the received RM cells thus yielding a finer measurement of the RTT in real time. As described above, the RTT is measured using the four-byte SN field encoded in the body of the RM cell. Note that the ATM Forum does not specify a use for the SN field in the RM cell unless it is set in accordance with the ITU-T I.371 standard. In either case, OAM cells can alternatively be utilized for measuring the RTT albeit with an increase in overhead and a reduction in performance. In this case, F5 OAM cells are used in the loopback mode of operation.

Figure 5:
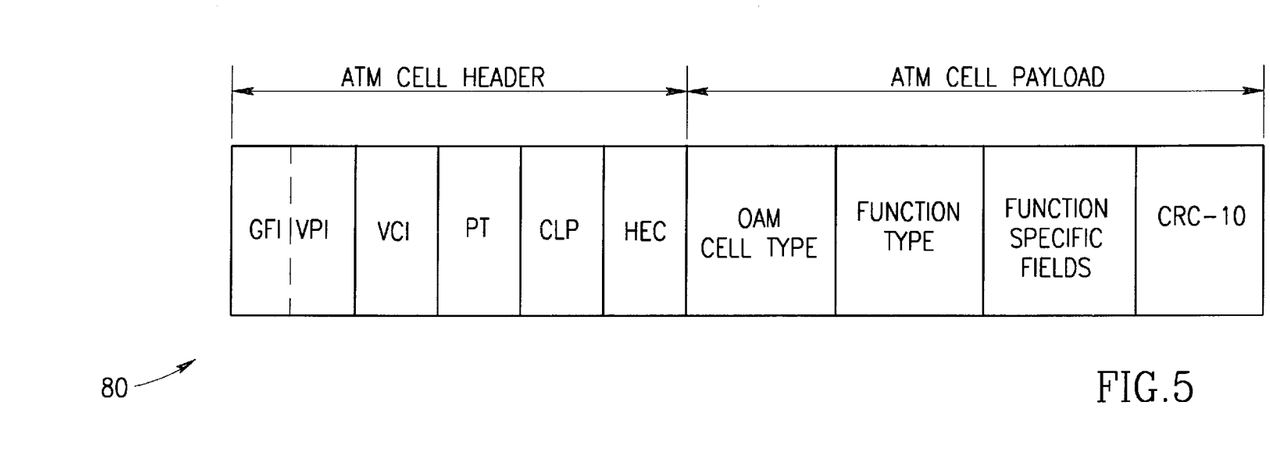
FIG. 5 is a diagram illustrating the fields and their positions in an OAM cell.
Figure 6:
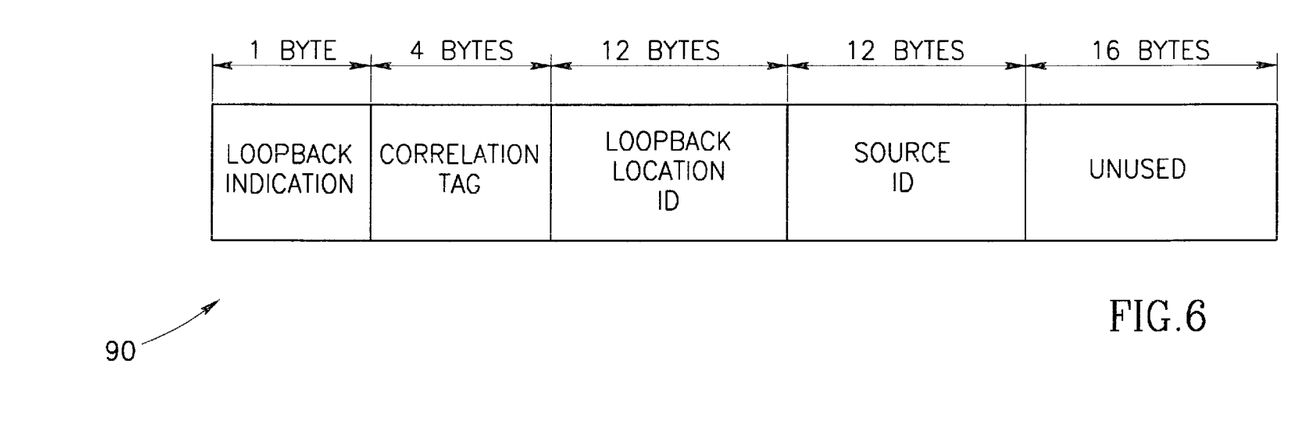
FIG. 6 is a diagram illustrating the fault management specific fields portion of the OAM cell.

A diagram illustrating the fields and their positions in an OAM cell is shown in FIG. 5. The VCC operation information is carried via the F5 flow OAM cells. These cells have the same VPI/VCI values as the user data cells but are identified by pre-assigned code points of the Payload Type (PT) field. End-to-end OAM cells are passed unmodified by all the intermediate nodes. The contents may be monitored by a node in the path. The format of the Function Specific fields of the Fault Management OAM cell is shown in FIG. 6.

Exponential Averaging Filter

The method of the present invention utilizes an exponential averaging filter in estimating a value for the RTT based on past measurements and the present measurement. As a sender sends a series of packets, it receives a series of acknowledgements (acks), and thus accumulates a series of RTT measurements. Instead of using the last measured RTT to set the timer, the series is smoothed to eliminate random fluctuations, i.e., noise. A known technique for doing so is based on the exponential averaging filter, which is described in more detail in Chapter 12 of "An Engineering Approach to Computer Networking," S. Keshav, Addison-Wesley, 1997, incorporated herein by reference.

If r(k) represents the measured value of the RTT using the kth packet, and a is a tuning parameter in the range [0,1], then the output of the filter is a smooth RTT estimate s(k) given by the following:

$$s(k)=as(k-1)+(1-a)r(k) \qquad (2)$$

In other words, the estimate adds a fraction of the new RTT to itself, retaining a fraction a of past history. The closer a is to 1.0, the larger the weight placed on past history, with a correspondingly smaller dependence on recent measurements. Thus, if the RTTs vary quickly, choosing a small a allows the estimate to track the input quickly. Conversely, if RTTs vary slowly, choosing a large a allows the estimate to ignore most of the noise.

A better estimate for the timeout is based on the mean deviation in the RTT. An additional error term e(k) is maintained in addition to its smoothed estimate m(k). These quantities are computed as follows:

$$s(k)=(1-a)r(k)+as(k-1)$$

$$e(k)=|s(k)-r(k)|$$

$$m(k)=(1-a)e(k)+am(k-1)$$

$$\text{timeout}(k)=s(k)+bm(k) \quad (3)$$

The term m measures the mean deviation from the mean and is an estimate of the standard deviation in r. If the distribution of the RTTs is approximately Gaussian, then a packet is expected to be processed with time s+bm, where different values of b yield different confidence intervals.

The SN field of the RM cell can also be used to overcome several of the problems associated with the above given RTT calculations. For example, if RM cells with SN=6 and 8 are received correctly, it can be deduced for certain that, RM cell with SN=7 has been lost, thus improving the calculated estimate.

Note that, as an option, if one or more RM cells are not acknowledged, the time interval spanning the missing acknowledgements is divided by the number of missing acknowledgements and this average is input to the filter.

ITU-T I.371 Recommendation

The following is material derived from the ITU-T I.371 standard, in particular, Section 5.5.5.2.3 which deals with the SN field of RM cells. This section concerns dynamically changing parameters and the RM cell format. A source may optionally make use of the sequence number (SN) field by incrementing the value of the sequence number (modulo $2^{32}$) in each subsequent RM cell. If a source does make use of the SN field, the following applies:

1. The sequence number is always present in RM cells;
2. It is always incremented by one in RM cells;

A source that does not make use of the SN field sets its value to zero. No other entity other than the source is permitted to modify the sequence number. When the destination sends a RM cell in response to a RM cell generated by the source, the sequence number is copied unchanged into that cell. Any other RM cell generated by the network or the destination must have the sequence number set equal to zero.

CRM Estimation Method

The method of estimating the CRM parameter utilizes the algorithm for ABR flow control that is described in detail in Section 5.10 of the Traffic Management Specification Version 4.0, ATM Forum, which is incorporated herein by reference. In particular, the method is an enhancement of the Source Behavior method presented in Section 5.10.4 of the Traffic Management Specification. Note that it is intended that the method presented herein is performed by the source end station. The function of the method is to adapt the value of the CRM parameter to the current state of the network on a dynamic real time basis.

The following variables are used in the method:

Variables:

| | |
|---|---|
| filter_Tx_enable | whether the estimating filter will operate on the Tx intervals or not; user settable and defaults to TRUE; |
| filter_RTT_enable | whether the estimating filter will operate on the RTT or not; user settable and defaults to TRUE; |
| RM_Tx_interval | the output of the method that determines the elapsed time between the transmission of two successive RM cells (optionally implements an exponential average filter); |
| RM_Tx_iterations | the number of RM cells between which are used to measure the RM_Tx_interval; defaults value is 2 and can be modified by the user; reduces the effects of jitter; e.g., can be every 2, 3, 4 or $N^{th}$ RM cell; |
| RTT_interval | the output of the method to determine the RTT (may optionally be implemented using an exponential average filter); |
| RTT_mul | how much larger the CRM parameter should be compared to the calculated value; for settling timeout times; default equals 2 and can be modified by the user; |
| RM_RTT_iterations | the number of RM cells between which the RTT is measured; default value is 2, i.e., the RTT measurement method uses 2 successive RM cells as input to the RTT estimation method; can be modified by the user; |
| last_Tx_RM_SN | the SN of the last RM cell transmitted; |
| last_Rx_RM_SN | the SN of the last RM cells received; |
| curr_Tx_rate | current transmission rate |
| curr_CRM | current value of the CRM parameter; |
| reset_CRM_param | in case there is a massive 1055 of RM cells, the RTT estimating method may be reset; this parameters defines how many RM cells must be lost before a reset is performed; can be modified by the user; |
| linear_co_1 | linear coefficient for adjusting the calculation of CRM; default value is one and can be set by the user; this value is an integer number. |
| linear_co_2 | linear coefficient for adjusting the calculation of CRM; default value is one and can be set by the user; this value is a real number. |
| init_CRM_param | number of RM cells permitted to be lost before resetting the system to default values-for events that do not cause the exponential averaging function to lose stability; must be less than $2^{32}$; can be modified by the user; |

Initializations:
last_Tx_RM_SN=0; can be set by the user;
last_Rx_RM_SN=0; can be set by the user;
init_CRM_param=50;
curr_Tx_rate=initial cell rate (ICR);
curr_CRM=4; or as defined by the Traffic Management Specification, i.e., $$CRM = \left\lceil \frac{TBE}{Nrm} \right\rceil;$$

RM_RTT_iterations=2 if not modified by the user;
RTT_mul=2 if not modified by the user;
Initialize two mechanisms for estimating RTT_interval and RM_Tx_interval;
filter_Tx_enable=TRUE or as set by the user;
linear_co_1=1 or as set by the user;
linear_co_2=1 or as set by the user;

ABR RM cells shall be sent with CLP=0. ABR RM cells with CLP=1 may be sent under the conditions explicitly states in Sections 5.10.4, 5.10.5 and 5.10.6. All other ABR cells shall be sent with CLP=0. For ABR, CLP=0 cells are called in-rate cells, and CLP=1 cells are called out of rate cells. One use of out of rate RM cells is to enable a rate increase for a connection that has an ACR of zero. The source would use the out of rate cells as probes to learn when it may increase its rate.

The following items define the source behavior for CLP=0 and CLP=1 cell streams of a connection. Data cells shall not be sent with CLP=1. CLP=0 represents a high priority to stay and low priority to be discarded and CLP=1 represents a low priority to stay and high priority to be discarded.

1. The value of ACR shall never exceed PCR, nor shall it ever be less than MCR. The source shall never send in-rate cells at a rate exceeding ACR. The source may always send in-rate cells at a rate less than or equal to ACR.
2. Before a source sends the first cell after connection setup, it shall set ACR to at most ICR. The first in-rate cell sent should be a forward RM cell.
3. After the first in-rate forward RM cell, in-rate cells shall be sent in the following order:
   a) The next in-rate cell shall be a forward RM cell if and only if, since the last in-rate forward RM cell was sent, either:
      i. At least Mrm in-rate cells have been sent and at least Trm time has elapsed, or
      ii. Nrm-1 in-rate cells have been sent.
   b) The next in-rate cell shall be a backward RM cell if condition (a) above is not met, if a backward RM cell is waiting for transmission, and if either:
      i. No in-rate backward RM cell has been sent since the last in-rate forward RM cell, or
      ii. No data cell is waiting for transmission.
   c) The next in-rate cell sent shall be a data cell is neither condition (a) nor condition (b) above is met, and if a data cell is waiting for transmission.
4. Cells sent in accordance with source behaviors #1, #2 and #3 shall have CLP=0.
5. Before sending a forward in-rate RM cell, if ACR>ICR and the time T that has elapsed since the last in-rate forward RM cell was sent is greater than ADTF, then ACR shall be reduced to ICR.
6. Before sending an in-rate forward RM cell, and after following behavior #5 above, if at least curr_CRM in-rate forward RM cells have been sent since the last backward RM cell with BN=0 was received, then ACR shall be reduced by at least ACR*CDF, unless that reduction would result in a rate below MCR, in which case ACR shall be set to MCR.
7. After following behaviors #5 and #6 above, the ACR value shall be placed in the CCR field of the outgoing forward RM cell, but only in-rate cells sent after the outgoing forward RM cell need to follow the new rate.
8. When a backward RM cell (in-rate or out of rate) is received with CI=1, then ACR shall be reduced by at least ACR*RDF, unless that reduction would resulting a rate below MCR, in which case ACR shall be set to MCR. If the backward RM cell has both CI=0 and NI=0, then the ACR may be increased by no more than RIF*PCR, to a rate not greater than PCR. If the backward RM cell has NI=1, the ACR shall not be increased.
9. When a backward RM cell (in-rate or out of rate) is received, and after ACR is adjusted according to source behavior #8, ACR is set to at most the minimum of ACR as computed in source behavior #8, and the ER field, but no lower than MCR.
10. When generating a forward RM cell, the source shall assign values to the various RM cell fields as generated for source specified cells in Table 5-4 on Page 41 of the Traffic Management Specification Version 4.0.
11. Forward RM cells may be sent out of rate (i.e., not conforming to the current ACR). Out of rate forward RM cells shall not be sent at a rate greater than TCR.
12. A source shall reset EFCI on every data cell is sends.
13. The source may implement a use it or lose it policy to reduce its ACR to a value that represents the actual cell transmission rate.

Figure 7:
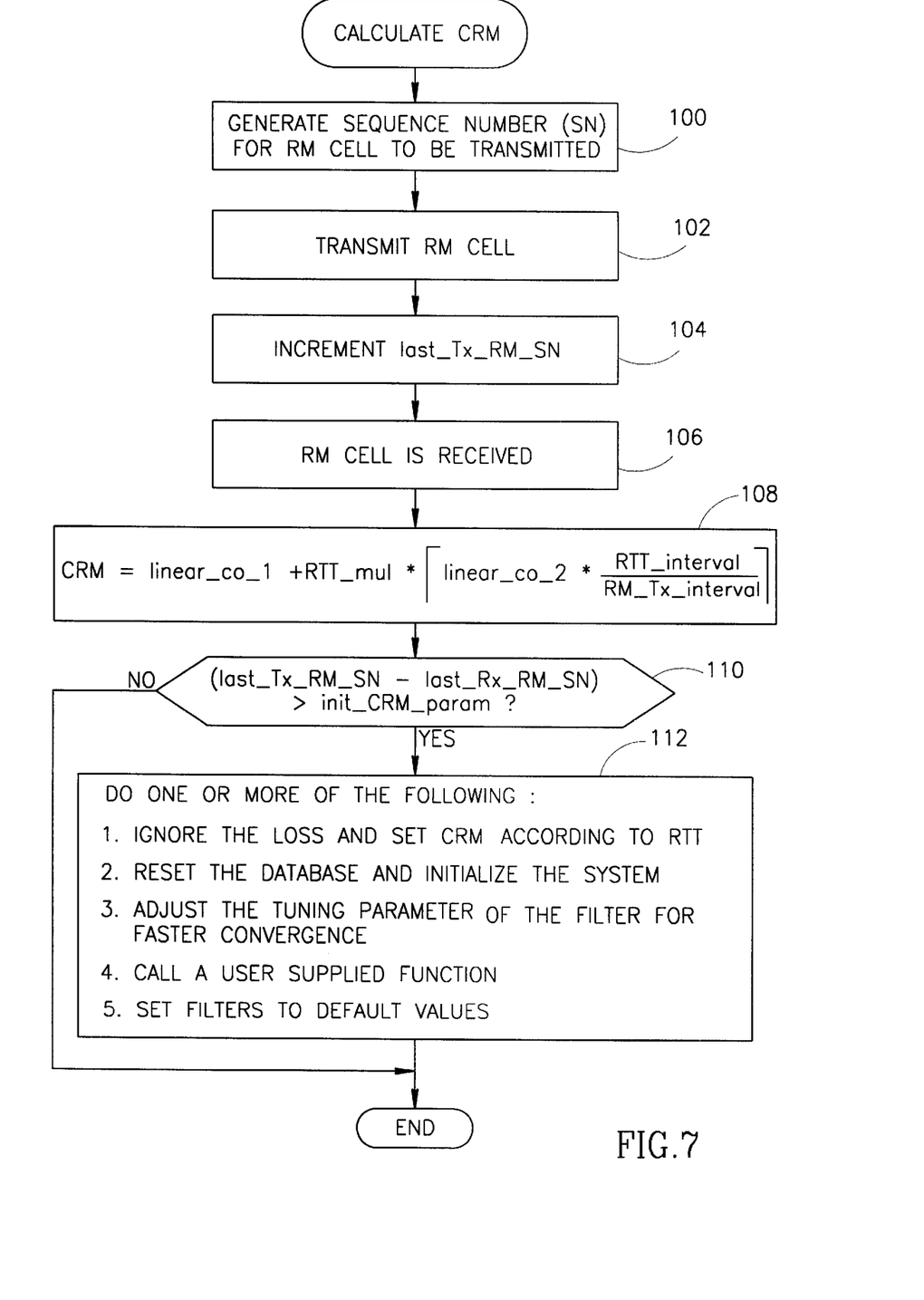
FIG. 7 is a flow diagram illustrating the CRM calculation method of the present invention.

With reference to the flow diagram illustrated in FIG. 7, the CRM calculation method of the present invention is presented in the remaining steps below.

14. A Sequence Number (SN) represented by last_Tx_RM_SN is generated and placed into each RM cell to be transmitted (step 100). This is done with regard to the requirement of the ITU-T I.371 standard regarding the use of the SN field in RM cells. The RM cell is transmitted (step 102). The SNs shall be ordinal numbers. After each RM cell transmission event, last_Tx_RM_SN is incremented (step 104).
15. When an RM cell is received and after writing and storing needed any necessary parameters in the database (step 106), set curr_CRM to the following (step 108):

$$\text{current\_CRM} = \text{linear\_co\_1} + \text{RTT\_mul} \cdot \left[ \text{linear\_co\_2} \cdot \frac{\text{RTT\_interval}}{\text{RM\_Tx\_interval}} \right] \quad (4)$$

The RTT_interval and RM_Tx_interval may be derived from the output of an exponential averaging filter such as described above, or from any other suitable filter means. Note that the upper limit ⌈ ⌉ shown in Equation 3 above, can be replaced with a lower limit ⌊ ⌋ without significantly effecting the results.

16. Calculate the number of lost RM cells using [last_Tx_RM_SN—last_Rx_RM_SN] and compare it to init_CRM_param (step 110). If the number of lost RM cells is greater, do one of the following in accordance with the user's preference (step 112):
   a) Ignore the loss and set the CRM parameters according to the RTT.
   b) Reset the database and set the system to Initialization values.
   c) Change the tuning parameter of the exponential averaging filter for faster convergence.
   d) Call a user supplied function.

Note that if the SN field of RM cells cannot be used, OAM cells can be used for measuring the RTT. In addition, the Nrm parameter can be modified while the method is running in order to fine tune and calibrate the system.

As an alternative, the user can be given an option to fix the value of the RM_Tx_interval parameter in Equation 3. A fixed interval can be set in situations such as when no data cells are to be transmitted and the Trm parameter has not been set. If this option is chosen, a preferred default value for a fixed RM_Tx_interval is 87.536 microseconds.

Note that in connection with step 15, the current CRM parameter can be calculated on each receive event only, on each transmission event only or on either receive or transmission events. The latter being useful to overcome unexpected network behavior.

In addition, the problem of sequence number wrap around can be addressed by avoiding use of the SN value equal to zero. Since, in accordance with the specification, all non source generated RM cells have their SN fields set to 0, this value cannot be used by the source end station for the SN field. When the method first starts up, this is not a problem, however, when approaching the upper values, SN wrap around would otherwise be a problem. Thus, all SN calculations must take into account that the zero value is not in use. Another reason for not using the zero value for the SN field is that the wrap around may damage the EAF calculations and cause Y2K problems.

Note also that in-rate forward and backward RM cells are included in the source rate allocated to a connection. The source is responsible for handling local congestion within its scheduler in a fair manner. This congestion occurs when the sum of the rates to be scheduled exceeds the output rate of the scheduler. The method for handling local congestion is implementation specific.

It is also pointed out that the method does not place any requirement on the switches that share the route between the source and destination.

Further, alternatives to Equation 3 for calculating the value of the CRM parameter can be used without departing from the spirit of the present invention. Other equations can be used that in general are a function of the two parameters RTT_interval and RM_Tx_interval as follows.

$$curr\_CRM = f(RTT\_interval, RM\_Tx\_interval) \quad (5)$$

In addition, the CRM value can be a function of time in addition to the above as follows.

$$curr\_CRM = f(RTT\_interval, RM\_Tx\_interval, time) \quad (6)$$

This can be used when it is desired to use different values of CRM for different times of the day or for systems that vary with time. For example, different CRM values can be used for morning hours when all employees start their computers at approximately the same time, evening hours, during certain events such as video conferencing, etc. The value for the CRM parameter can be changed automatically in accordance with the time of day or can be set manually on demand.

While the invention has been described with respect to a limited number of embodiments, it will be appreciated that many variations, modifications and other applications of the invention may be made.

What is claimed is:

1. A method for adapting the missing Resource Management (RM) cell count (CRM) parameter for a Virtual Circuit (VC) in a Traffic Management (TM) descriptor to the state of an Asynchronous Transfer Mode (ATM) network, said method comprising the steps of:

measuring the round trip time (RTT) value from a source end station (SES) to a destination end station (DES) and back; and measuring the transmission time interval between consecutive transmissions;

calculating an estimate for said CRM parameter utilizing the following equation:

$$\text{current\_CRM} = \text{linear\_co\_1} + \text{RTT\_mul} \cdot \left[ \text{linear\_co\_2} \cdot \frac{\text{RTT\_interval}}{\text{RM\_Tx\_interval}} \right]$$

wherein
curr_CRM is the current estimate of the CRM parameter;
linear_co_1 is a first linearity coefficient for adjusting the calculation of RM;
linear_co_2 is a second linearity coefficient for adjusting the calculation of RM;
RTT_mul defines how much larger CRM should be relative to the calculated value;
RTT_interval is said round trip time interval;
RM_Tx_interval is the elapsed time between the transmission of N successive RM cells, wherein N is a positive integer.

2. The method according to claim 1, wherein said step of measuring the round trip time comprises the steps of:
setting a Sequence Number (SN) field of said RM cell to a unique value;
transmitting said RM cell;
recording the time of transmission of said RM cell in a database;
receiving said RM cell some time later;
recording the time of reception of said RM cell in said database; and
calculating said round trip time utilizing said time of transmission and said time of reception.

3. The method according to claim 1, wherein said step of measuring the round trip time comprises the steps of:
setting a field in the Function Specific Fields portion of an Operation and Maintenance (OAM) cell to a unique sequence number;
transmitting said RM cell;
recording the time of transmission of said RM cell in a database;
receiving said RM cell some time later;
recording the time of reception of said RM cell in said database; and
calculating said round trip time utilizing said time of transmission and said time of reception.

4. The method according to claim 1, wherein the parameter RM_Tx_interval is set to a predefined fixed value.

5. A method for adapting the missing Resource Management (RM) cell count (CRM) parameter for a Virtual Circuit (VC) in a Traffic Management (TM) descriptor to the state of an Asynchronous Transfer Mode (ATM) network, said method comprising the steps of:

measuring the round trip time (RTT) value from a source end station (SES) to a destination end station (DES) and back;

measuring the transmission time interval between consecutive transmissions;

filtering a plurality of said round trip time values utilizing an exponential averaging filter;

calculating an estimate for said CRM parameter utilizing the following equation:

$$\text{current\_CRM} = \text{linear\_co\_1} + \text{RTT\_mul} \cdot \left[ \text{linear\_co\_2} \cdot \frac{\text{RTT\_interval}}{\text{RM\_Tx\_interval}} \right]$$

wherein
curr_CRM is the current estimate of the CRM parameter;
linear_co_1 is a first linearity coefficient for adjusting the calculation of RM;
linear_co_2 is a second linearity coefficient for adjusting the calculation of RM;
RTT_mul defines how much larger CRM should be relative to the calculated value;
RTT_interval is the round trip time interval filtered by said exponential averaging filter;
RM_Tx_interval is the elapsed time between the transmission of N successive RM cells filtered by said exponential averaging filter, wherein N is an integer.

6. The method according to claim 5, wherein said step of measuring the round trip time comprises the steps of:
  setting a Sequence Number (SN) field of said RM cell to a unique value;
  transmitting said RM cell;
  recording the time of transmission of said RM cell in a database;
  receiving said RM cell some time later;
  recording the time of reception of said RM cell in said database; and
  calculating said round trip time utilizing said time of transmission and said time of reception.

7. The method according to claim 5, wherein said step of measuring the round trip time comprises the steps of:
  setting a field in the Function Specific Fields portion of an Operation and Maintenance (OAM) cell to a unique sequence number;
  transmitting said RM cell;
  recording the time of transmission of said RM cell in a database;
  receiving said RM cell some time later;
  recording the time of reception of said RM cell in said database; and
  calculating said round trip time utilizing said time of transmission and said time of reception.

8. The method according to claim 5, wherein the parameter RM_Tx_interval is set to a predefined fixed value.

9. A method for adapting the missing Resource Management (RM) cell count (CRM) parameter for a Virtual Circuit (VC) in a Traffic Management (TM) descriptor to the state of an Asynchronous Transfer Mode (ATM) network, said method comprising the steps of:
  measuring the round trip time (RTT) value from a source end station (SES) to a destination end station (DES) and back; and
  measuring the transmission time interval between consecutive transmissions;
  calculating an estimate for said CRM parameter as a function of the following:

$curr\_CRM=f(RTT\_interval, RM\_Tx\_interval)$ wherein
    curr_CRM is the current estimate of the CRM parameter;
    RTT_interval is said round trip time interval;
    RM_Tx_interval is the elapsed time between the transmission of N successive RM cells, wherein N is an integer.

10. The method according to claim 9, wherein said calculation of said CRM parameter is also a function of time.

11. The method according to claim 9, wherein said step of measuring the round trip time comprises the steps of:
  setting a Sequence Number (SN) field of said RM cell to a unique value;
  transmitting said RM cell;
  recording the time of transmission of said RM cell in a database;
  receiving said RM cell some time later;
  recording the time of reception of said RM cell in said database; and
  calculating said round trip time utilizing said time of transmission and said time of reception.

12. The method according to claim 9, wherein said step of measuring the round trip time comprises the steps of:
  setting a field in the Function Specific Fields portion of an Operation and Maintenance (OAM) cell to a unique sequence number;
  transmitting said RM cell;
  recording the time of transmission of said RM cell in a database;
  receiving said RM cell some time later;
  recording the time of reception of said RM cell in said database; and
  calculating said round trip time utilizing said time of transmission and said time of reception.

13. The method according to claim 9, wherein the parameter RM_Tx_interval is set to a predefined fixed value.

14. A method for adapting the missing Resource Management (RM) cell count (CRM) parameter for a Virtual Circuit (VC) in a Traffic Management (TM) descriptor to the state of an Asynchronous Transfer Mode (ATM) network, said method comprising the steps of:
  measuring the round trip time (RTT) value from a source end station (SES) to a destination end station (DES) and back;
  measuring the transmission time interval between consecutive transmissions;
  filtering a plurality of said round trip time values utilizing an exponential averaging filter;
  calculating an estimate for said CRM parameter as a function of the following:

$curr\_CRM=f(RTT\_interval, RM\_Tx\_interval)$ wherein
    curr_CRM is the current estimate of the CRM parameter;
    RTT_interval is the round trip time interval filtered by said exponential averaging filter;
    RM_Tx_interval is the elapsed time between the transmission of N successive RM cells filtered by said exponential averaging filter, wherein N is an integer.

15. The method according to claim 14, wherein said calculation of said CRM parameter is also a function of time.

16. The method according to claim 14, wherein said step of measuring the round trip time comprises the steps of:
  setting a Sequence Number (SN) field of said RM cell to a unique value;
  transmitting said RM cell;
  recording the time of transmission of said RM cell in a database;
  receiving said RM cell some time later;
  recording the time of reception of said RM cell in said database; and
  calculating said round trip time utilizing said time of transmission and said time of reception.

17. The method according to claim 14, wherein said step of measuring the round trip time comprises the steps of:
  setting a field in the Function Specific Fields portion of an Operation and Maintenance (OAM) cell to a unique sequence number;
  transmitting said RM cell;
  recording the time of transmission of said RM cell in a database;

receiving said RM cell some time later;

recording the time of reception of said RM cell in said database; and calculating said round trip time utilizing said time of transmission and said time of reception.

18. The method according to claim 14, wherein the parameter RM_Tx_interval is set to a predefined fixed value.

\* \* \* \* \*